United States Patent
Jongren

(10) Patent No.: US 9,059,755 B2
(45) Date of Patent: Jun. 16, 2015

(54) METHODS AND APPARATUS USING PRECODING MATRICES IN A MIMO TELECOMMUNICATIONS SYSTEM

(75) Inventor: George Jongren, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 948 days.

(21) Appl. No.: 13/000,511

(22) PCT Filed: Jun. 8, 2009

(86) PCT No.: PCT/SE2009/050687
§ 371 (c)(1),
(2), (4) Date: Dec. 21, 2010

(87) PCT Pub. No.: WO2010/002325
PCT Pub. Date: Jan. 7, 2010

(65) Prior Publication Data
US 2011/0110403 A1    May 12, 2011

Related U.S. Application Data

(60) Provisional application No. 61/077,353, filed on Jul. 1, 2008.

(51) Int. Cl.
*H04B 7/04* (2006.01)
*H04L 27/26* (2006.01)
*H04L 25/03* (2006.01)

(52) U.S. Cl.
CPC .......... *H04B 7/0456* (2013.01); *H04L 27/2636* (2013.01); *H04L 25/03343* (2013.01); *H04L 27/2614* (2013.01); *H04L 2025/03426* (2013.01); *H04L 25/03891* (2013.01)

(58) Field of Classification Search
CPC ................ H04L 5/007; H04L 27/2636; H04L 25/03343; H04L 2025/03426; H04L 5/003; H04L 27/2614; H04B 7/0639; H04B 7/0413; H04B 7/0456; H04B 7/0465
USPC .................. 375/260, 267; 370/252, 254, 329; 455/522
See application file for complete search history.

(56) References Cited

U.S. PATENT DOCUMENTS

2007/0041457 A1    2/2007  Kadous et al.
2011/0075651 A1*   3/2011  Jia et al. ........................ 370/344

OTHER PUBLICATIONS

Ericsson: "Precoding Considerations in LTE MIMO Downlink" 3GPP Draft; R1-071044, 3rd Generation Partnership Project (3GPP), vol. TSG-RAN WG1, No. 28, St. Louis, USA; Feb. 6, 2007.*
Japanese Office Action, Japanese Patent Application No. 2011-516219, dated Nov. 7, 2011, 4 pages.

(Continued)

*Primary Examiner* — Daniel Washburn
*Assistant Examiner* — Eboni Hughes
(74) *Attorney, Agent, or Firm* — Rothwell, Figg, Ernst & Manbeck, P.C.

(57) ABSTRACT

The present invention provides methods and apparatus for transmitting and receiving over a MIMO radio link. In particular, a precoding matrix is applied to transmitted signals and constrained in such a way so as to limit the additional peak to average power ratio (PAPR) caused by applying the precoding matrix. For example, each row of the precoding matrix may have at least one zero element and one non-zero element, and each column may have at least one non-zero element.

17 Claims, 5 Drawing Sheets

(56) References Cited

OTHER PUBLICATIONS

Texas Instruments, "Uplink SU-MIMO for E-UTRA", 3GPP Draft, R1-082707 TI ULSUMIMO Rev, 3rd Generation Partnership Project (3GPP), Mobile Competence Centre, 650 Route Des Lucioles, F-06921 Sophia-Antipolis Cedex, France, vol. RAN WG1, No. Warsaw, Poland, Jul. 3, 2008, XP050110944, 6 pages.

European Search Report issued on Oct. 11, 2012, in corresponding European Application No. 12184173, 8 pages.

Office Action issued on Jun. 30, 2011 in corresponding European Application No. 09 773 840.5, 7 pages.

Myung, Hyung G., et al., "Peak Power Characteristics of Single Carrier FDMA MIMO Precoding System", Vehicular Technology Conference, 2007, VTC-2007, Fall 2007 IEEE, PI, Sep. 1, 2007, pp. 477-481, XP031147449.

Japanese Office Action from Apn. No. JP2011-516219, Received date Mar. 16, 2012, 4 pages.

Ericsson: "Precoding Considerations in LTE MIMO Downlink" 3GPP Draft; R1-071044, 3rd Generation Partnership Project (3GPP), vol. TSG-RAN WG1, No. 28, St. Louis, USA; Feb. 6, 2007, XP050105041.

LG Electronics: "Codebook Design and Evaluation for E-UTRA MIMO Precoding—4Tx Rank Adaptation Scheme" 3GPP Draft; R1-070914, Codebook, 3rd Generation Partnership Project (3GPP), vol. TSG-RAN WG1, No. 48, St. Louis, USA; Feb. 7, 2007, XP050104924.

NTT DoCoMo, Inc., "Proposais for LTE-Advanced Technologies", 3GPP TSG RAN WG1 Meeting #53, Kansas City, USA, May 5-9, 2008, R1-081948, Agenda Item 6.2; 29 pages.

Texas Instruments, "Enhancements for LTE-Advanced", 3GPP TSG RAN WG1 Meeting #53, Kansas City, USA, May 5-9, 2008, R1-081979, Agenda Item 6.2; 13 pages.

\* cited by examiner

METHODS AND APPARATUS USING PRECODING MATRICES IN A MIMO TELECOMMUNICATIONS SYSTEM

CROSS REFERENCE TO RELATED APPLICATION(S)

This application is a 35 U.S.C. §371 National Phase Entry Application from PCT/SE2009/050687, filed Jun. 8, 2009, and designating the United States and claiming priority to U.S. Patent Application No. 61/077,353 filed Jul. 1, 2008, the disclosures of which are incorporated herein in their entirety by reference.

TECHNICAL FIELD

This invention relates to telecommunications systems, and in particular to methods and apparatus for transmitting and receiving over a multiple-input, multiple-output (MIMO) radio link.

BACKGROUND

Multi-antenna techniques can significantly increase the data rates and reliability of a wireless communication system. The performance is in particular improved if both the transmitter and the receiver are equipped with multiple antennas. This results in a multiple-input, multiple-output (MIMO) communication channel and such systems and/or related techniques are commonly referred to as MIMO.

Several wireless standards support MIMO antenna deployments and MIMO related techniques. FIG. 1 shows an example of a MIMO transmission system 2. The system 2 comprises a precoder 4 and $N_T$ antennas 6, where $N_T$ is an integer greater than one.

In use, a sequence of information-carrying symbol vectors $s_k$ is input to the precoder 4 to be precoded before transmission by the antennas 6 over a resource element k. The resource element k corresponds to a single use of the MIMO channel, and may for example correspond to a time interval, a particular range of frequencies, a spreading code, or any combination of one or more of these quantities. Each of the r symbols in $s_k$ belongs to a specific layer, with r (i.e. the number of layers) being known as the transmission rank. Another commonly used term for layer is symbol stream.

The symbol vector $s_k$ is multiplied in the precoder 4 by an $N_T \times r$ precoding matrix $W_k$, thereby generating a precoded symbol vector $x_k$. The precoded symbol vector $x_k$ is provided to the antennas 6, where it is transmitted, with each antenna transmitting one element of the precoded symbol vector $x_k$.

The precoded symbol vector $x_k$ can thus be written as:

$$x_k = \begin{bmatrix} x_k^{(1)} \\ x_k^{(2)} \\ \vdots \\ x_k^{(N_T)} \end{bmatrix} = \begin{bmatrix} W_k^{(11)} & W_k^{(12)} & \cdots & W_k^{(1r)} \\ W_k^{(21)} & W_k^{(22)} & \cdots & W_k^{(2r)} \\ \vdots & \vdots & & \vdots \\ W_k^{(N_T1)} & W_k^{(N_T2)} & \cdots & W_k^{(N_Tr)} \end{bmatrix} \begin{bmatrix} s_k^{(1)} \\ s_k^{(2)} \\ \vdots \\ s_k^{(r)} \end{bmatrix} = W_k s_k \quad (1)$$

The precoding matrix $W_k$ is often chosen to match the characteristics of the $N_R \times N_T$ MIMO channel $H_k$ over which the signals are transmitted (where $N_R$ is the number of receiving antennas). Thus, the precoding matrix may be chosen to focus the transmit energy into a subspace which is strong in the sense of conveying as much of the transmitted energy to the receiving device as possible. In addition, the precoding matrix $W_k$ may be chosen to orthogonalize the channel, meaning that after proper linear equalization at the receiving device, the inter-layer interference is reduced.

Subsequent to precoding, the information-carrying precoded symbol vectors are converted to time-continuous signals and amplified to produce the signals transmitted from the antennas 6. In order to avoid distortion of the signals, the amplifiers need to be dimensioned so that they can cover the dynamic range of the signals to be amplified. Peak to average power ratio (PAPR) is a measure of the relative dynamic range of a signal and it is generally desirable to keep it small (i.e. close to one) so as to minimize the requirements of the amplifiers and thus reduce cost. PAPR is one of several possible measures of the dynamic range of signal. Hereinafter, references to reduction of the PAPR of a signal are taken to mean the reduction of the dynamic range of the signal according to any measure.

One method of selecting the precoding matrix is to use a so-called "codebook" of predefined precoding matrices from which an appropriate matrix can be selected. This simplifies the selection process greatly. For example, the current version of Release 8 of the 3GPP specifications (also known as long term evolution, or LTE) specifies the following codebook when two transmit antennas are employed:

$$W = W_k \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 & 1 \\ 1 & -1 \end{bmatrix}, \begin{bmatrix} 1 & 1 \\ j & -j \end{bmatrix} \right\} \quad (2)$$

The first four matrices are for a transmission rank of one. The last two matrices are for a transmission rank of two.

However, the codebook for future releases of the 3GPP specifications is undefined.

SUMMARY OF INVENTION

A problem with existing precoder solutions is that for transmission rank two and higher, precoding tends to increase the PAPR. Using (1) for the example of a transmission rank of two, and selecting the first rank two precoding matrix from the LTE codebook (2) gives a transmitted precoded symbol vector of:

$$x_k = \begin{bmatrix} 1 & 1 \\ 1 & -1 \end{bmatrix} \begin{bmatrix} s_k^{(1)} \\ s_k^{(2)} \end{bmatrix} = \begin{bmatrix} (s_k^{(1)} + s_k^{(2)}) \\ (s_k^{(1)} - s_k^{(2)}) \end{bmatrix} \quad (3)$$

As can be seen, the signals from two different layers are mixed together. Such mixing of signals may significantly increase the PAPR and thus increase the cost and complexity of the transmitter. Note that the PAPR tends to increase with the number of mixed signals, but that the relative increase for each additional mixed signal decreases progressively, so the mixing of two layers tends to incur the largest additional PAPR increase.

Increase of PAPR would be a particularly serious problem in future releases of the 3GPP specifications, for example, where special care has been taken to design a single-carrier uplink in order to keep the PAPR low. If spatial multiplexing is to be introduced in the uplink, there are therefore strong reasons to maintain the low PAPR.

To mitigate the problems described above associated with these existing solutions, transmitting devices according to the present invention reduce the PAPR of transmitted signals by imposing a certain structure on the precoding matrix such that mixing of signals is avoided.

According to the present invention, there is provided a communication device for transmitting over a MIMO radio link. The communication device comprises a transmitter comprising a plurality of antennas, and processing circuitry (16). The processing circuitry is adapted to apply a precoding matrix to a symbol vector, to generate a precoded vector. The precoding matrix has four rows and two or three columns. The transmitter is adapted to transmit the precoded vector over a MIMO radio link. The precoding matrix is constrained such that each row comprises at least one zero element, such that the number of non-zero elements in each row is less than the number of columns in said precoding matrix. The precoding matrix is further constrained in that each of the columns has at least one non-zero element and each of the rows has at least one non-zero element, such that any increase in the peak to amplitude power ratio (PAPR), caused by applying the precoding matrix to the symbol vector, is limited.

According to a further aspect of the present invention, there is provided a communication device for receiving over a MIMO radio link. The communication device comprises a transceiver comprising a plurality of antennas, and processing circuitry. The processing circuitry is adapted to determine a precoding matrix used by a remote communication device to generate a precoded vector from a symbol vector, for transmission over a MIMO radio link to the communication device. The transceiver is adapted to receive over the MIMO radio link the precoded vector that has been precoded with the determined precoding matrix, and the processing circuitry is further adapted to decode the received precoded vector. The precoding matrix has four rows and two or three columns, and is constrained such that each row comprises at least one zero element, such that the number of non-zero elements in each row is less than the number of columns in the precoding matrix. The precoding matrix is further constrained in that each of the columns has at least one non-zero element and each of the rows has at least one non-zero element, such that any increase in the peak to amplitude power ratio (PAPR), caused by applying the precoding matrix to the symbol vector, is limited.

Corresponding methods of transmitting and receiving over the MIMO radio link are also provided.

In one embodiment, the precoding matrix is constrained such that each row has a single non-zero element. By ensuring the precoding matrix has a single non-zero element per row, mixing of signals from different layers is avoided.

In another embodiment, the precoding matrix is constrained such that each column has the same number of non-zero elements. In this way, each layer is transmitted with substantially the same power.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
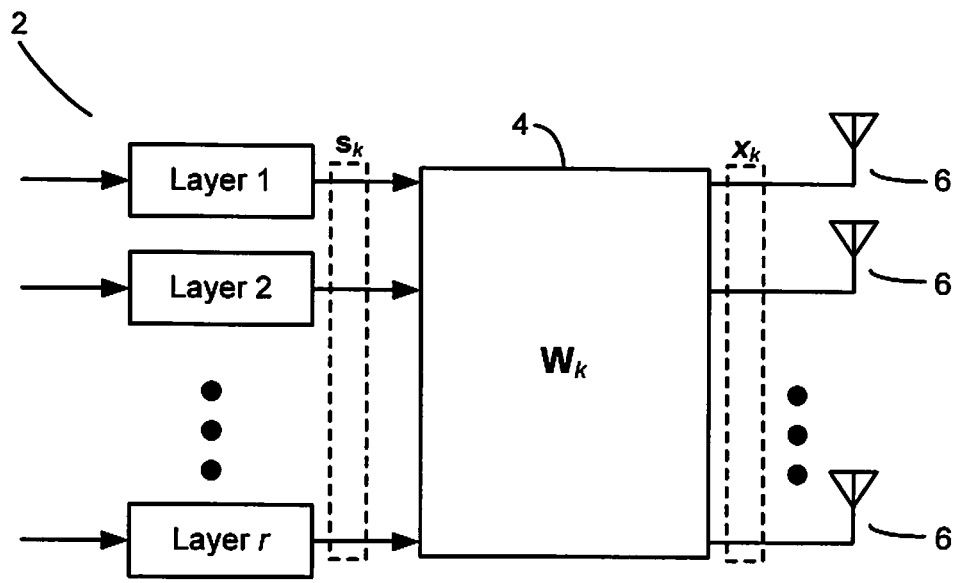
FIG. 1 shows a MIMO transmission system.
Figure 2:
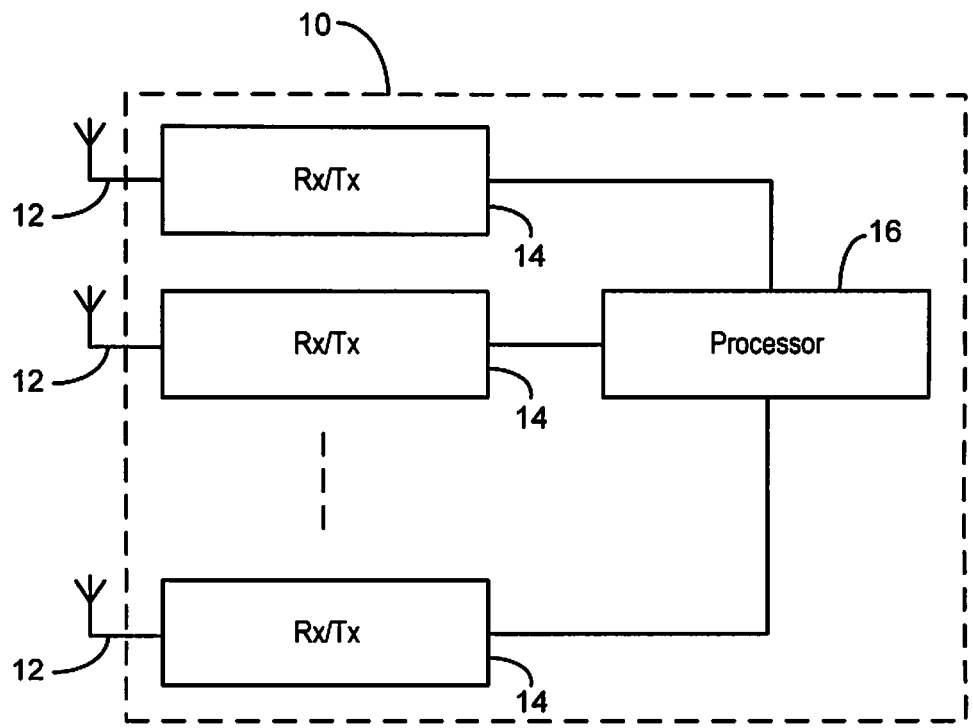
FIG. 2 shows a communication device according to embodiments of the present invention.

FIG. 2 shows a communication device 10 of a telecommunications network. The communication device 10 may be a mobile terminal (also known as a user equipment) or a radio base station (also known as a NodeB or an evolved NodeB), or any other device suitable for transmitting and/or receiving MIMO communications.

The communication device 10 comprises a plurality of antennas 12. FIG. 2 shows at least three antennas, but it will be understood by those skilled in the art that there may be as few as two, or more than three antennas. In certain embodiments of the present invention, the communication device 10 has four antennas 12. Each antenna 12 is coupled to respective Rx/Tx circuitry 14, and each Rx/Tx circuitry 14 is further coupled to processing circuitry 16. As described above, each Rx/Tx circuitry 14 comprises an amplifier for amplifying the signal to be transmitted by its respective antenna 12. Again, it will be apparent to those skilled in the art that in alternative configurations, the communication device 10 may comprise fewer separate Rx/Tx circuitry 14 than the number of antennas 12, with signals from more than one antenna 12 being coupled to the same Rx/Tx circuitry 14. For example, the communication device 10 may comprise a single Rx/Tx circuitry 14, with signals from all of the antennas 12 being coupled to the single Rx/Tx circuitry 14.

The processing circuitry may be adapted for single-carrier transmission, and in particular may be adapted for discrete Fourier transform spread orthogonal frequency division multiplexed (DFTS-OFDM) transmissions.

In certain embodiments of the present invention, the antennas 12 are operable to receive transmissions from other communication devices. These transmissions are demodulated in the Tx/Rx circuitry 14, and decoded in the processing circuitry 16. In other embodiments of the present invention, the antennas 12 are operable to transmit signals to other communication devices. Such signals may be generated in the processing circuitry 16, before being modulated in the Tx/Rx circuitry 14 and passed to the antennas 12 for transmission. Further details of the precise operation of the components of the communication device 10 will be described below.

Figure 3:
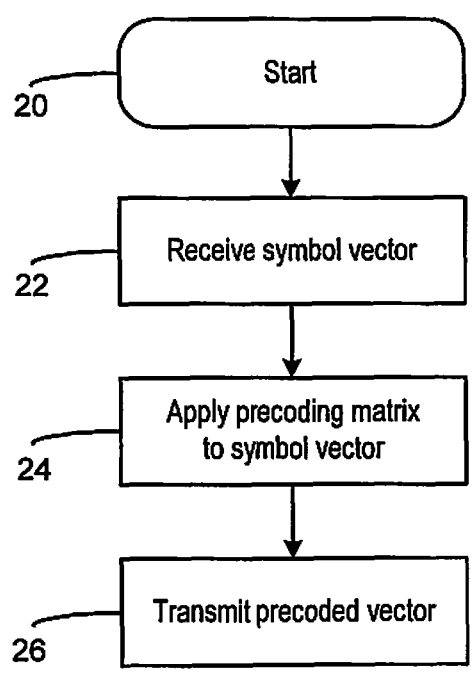
FIG. 3 shows a first method according to embodiments of the present invention.

FIG. 3 is a flowchart illustrating a method according to the present invention. The method starts in step 20.

In step 22, the processing circuitry receives a symbol vector $s_k$, for transmission over a resource element k, the symbol vector comprising r symbols $s_k$, where r is an integer equal to or greater than one, and is referred to as the transmission rank. The symbol vector $s_k$ may be received from a number of sources, depending on the type of communication device 10. For example, if the communication device 10 is a mobile terminal, the symbol vector $s_k$ may comprise data stored in a memory of the mobile terminal, or voice data from the user of the mobile terminal, for transmission to a radio base station. If the communication device is a radio base station, the symbol vector $s_k$ may comprise data received from a core network of the telecommunications network, for transmission to a mobile terminal.

In particular, in embodiments of the present invention, r is equal to two or three.

In step 24, the processing circuitry applies an $N_T \times r$ precoding matrix $W_k$ to the symbol vector $s_k$, to generate a precoded vector, where $N_T$ is the number of antennas 12. The features and constraints of the precoding matrix $W_k$ will be described in greater detail below. The precoding matrix $W_k$ may be generated or selected in any of a number of ways.

In particular, in embodiments of the present invention, $N_T$ is equal to four.

In step 26, the processing circuitry sends respective precoded symbols of the precoded vector to respective Rx/Tx circuitry 14, where they are modulated before being transmitted by respective antennas 12.

According to embodiments of the present invention, the precoding matrix $W_k$ is configured to minimize, or at least limit, mixing of symbol streams in the transmitted precoding vector, and so to minimize, or at least limit, the increase in the PAPR of the transmitted signals caused by applying the precoding matrix.

For example, in one embodiment, the precoding matrix $W_k$ is configured to have at least one zero element per row. This means that the precoding matrix $W_k$ is also configured to have at least one non-zero element per row, i.e. no row is completely zero as this would mean that one of the antennas is unused. Further, in an embodiment, the precoding matrix $W_k$ is configured to have at least one zero element per column. This means that the precoding matrix $W_k$ is also configured to have at least one non-zero element per column, i.e. no column is completely zero, as this would mean that one layer is not transmitted.

In one embodiment, the precoding matrix $W_k$ is configured such that each row has a single non-zero element. In this way, mixing of signals from different layers is reduced because the signal transmitted on the lth antenna 12 will be $$x_k^{(l)} = W_k^{(lm)} s_k^{(m)}$$

where m is the column of the precoding matrix $W_k$ in which the non-zero element resides.

As mentioned above, it is desirable for the usage of the amplifiers in the Rx/Tx circuitry 14 to be balanced, to reduce the complexity of the transmitter. In a further embodiment, therefore, the norm (i.e. the absolute value) of each row of the precoding matrix $W_k$ is constrained to be the same. In the embodiment where each row has a single non-zero element, this means that each non-zero element has the same norm.

The precoding matrix $W_k$ may also be configured such that each column has the same number of non-zero elements, such that a balanced power-per-layer is achieved. In particular, in an embodiment where each non-zero element has the same norm, this implies that each layer is transmitted with the same overall transmit power.

In a further embodiment, the precoding matrix $W_k$ is constrained to correspond to so-called unitary precoding in which the columns in the precoding matrix form a scaled orthonormal set. The terminology "unitary precoding" stems from the fact that the columns of a unitary matrix W (i.e., a matrix fulfilling $W^*W = WW^* = I$, where $W^*$ is the complex conjugate of W and I is the identity matrix) indeed form an orthonormal set and that the precoding matrices can be seen as corresponding to column subsets of unitary matrices.

Depending on the number of transmitting antennas, $N_T$, and the transmission rank r, it may not be possible to satisfy one or more of these constraints on the precoding matrix $W_k$. For example, for a transmission rank of three and four transmitting antennas, it is not possible to simultaneously have a single non-zero element per row and the same number of non-zero elements per column of the precoding matrix $W_k$. In such a case, therefore, it is necessary to relax one or more of these constraints. For example, different numbers of non-zero elements per column may be allowed, or more than one non-zero element per row. This means that mixing of the signals is inevitable; however, the constraints may be applied with soft limits, such that if it is impossible to have a single non-zero element per row (while having the same number of non-zero elements per column), a constraint of two non-zero elements in some rows is applied. In this way, mixing of the signals is at least limited, such that the increase in the PAPR of the transmitted signals is limited.

The precoding matrix may be selected or generated by any of a number of methods. For example, the precoding matrix may be selected from a "codebook", i.e. a plurality of predefined precoding matrices. The codebook may comprise a plurality of predetermined precoding matrices, each of which satisfies the requirements listed above for a particular transmission rank, or a subset (i.e. two or more) of which satisfies the requirements listed above for a particular transmission rank. That is, all of the precoding matrices or a subset of them are defined such that any increase in PAPR is limited, or such that no increase in PAPR is experienced, by application of the precoding matrices to a symbol vector. In one embodiment, there are eight precoding matrices in the subset. In another embodiment, at least half the precoding matrices for a particular transmission rank satisfy the requirements listed above. In an exemplary embodiment where some compromise in the requirements above is necessary, at least half the precoding matrices for at least one transmission rank may have one column with one more non-zero element than the other columns.

One possible codebook for a transmission rank of two and satisfying the constraints of a single non-zero element per row and the same number of non-zero elements for each column is $$W = W_k \in \left\{ \begin{bmatrix} 1 & 0 \\ 0 & 1 \\ 1 & 0 \\ 0 & 1 \end{bmatrix}, \begin{bmatrix} 1 & 0 \\ 0 & 1 \\ -1 & 0 \\ 0 & 1 \end{bmatrix}, \begin{bmatrix} 1 & 0 \\ 0 & 1 \\ 1 & 0 \\ 0 & -1 \end{bmatrix}, \begin{bmatrix} 1 & 0 \\ 0 & 1 \\ -1 & 0 \\ 0 & -1 \end{bmatrix}, \begin{bmatrix} 1 & 0 \\ 0 & -1 \\ 1 & 0 \\ 0 & -1 \end{bmatrix}, \begin{bmatrix} 1 & 0 \\ 0 & -1 \\ -1 & 0 \\ 0 & -1 \end{bmatrix}, \begin{bmatrix} 1 & 0 \\ 0 & -1 \\ 1 & 0 \\ 0 & 1 \end{bmatrix}, \begin{bmatrix} 1 & 0 \\ 0 & -1 \\ -1 & 0 \\ 0 & 1 \end{bmatrix} \right\}$$

Alternatively, the precoding matrix W may be generated in real time.

As described above, the precoding matrix W may be generated or selected to match the characteristics of the MIMO channel over which the signals are to be transmitted. This is known as channel-dependent precoding or closed-loop precoding.

Figure 4:
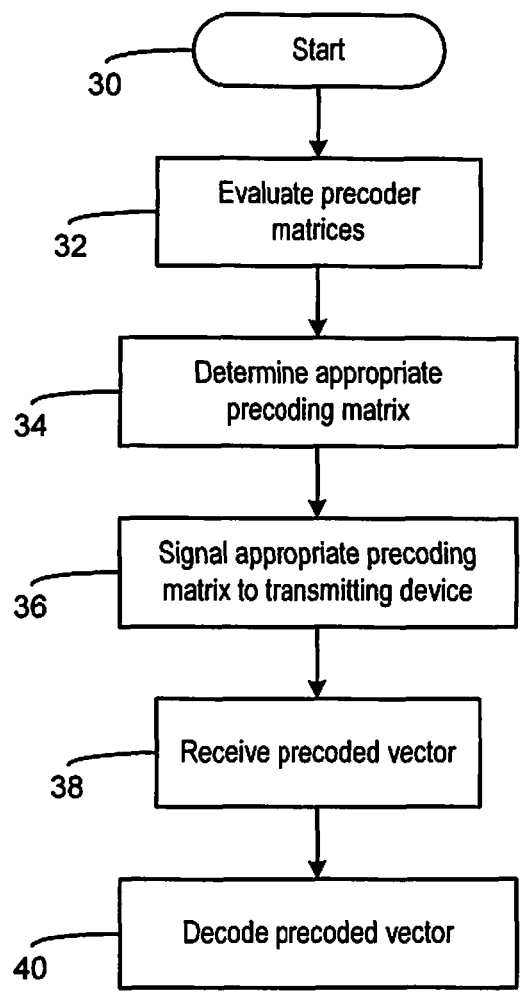
FIG. 4 shows a second method according to embodiments of the present invention.

FIG. 4 is a flowchart of a method in a receiving communication device according to embodiments of the present invention.

The method begins in step 30. In step 32, the communication device 10 measures the channel conditions and evaluates the predetermined precoding matrices in the codebook to determine their suitability. The evaluated precoding matrices are any that satisfy the requirements to limit additional PAPR, as described above with respect to FIG. 3.

The receiving communication device 10 may be signalled by the transmitting device of which channel to measure. Based on knowledge of the channel conditions, the precoding matrix and the noise and interference level, the receiver can calculate the signal to interference and noise ratios (SINRs)

for each layer. With this information it can map the SINRs to a performance measure, for example the sum predicted throughput over all layers.

According to one embodiment, for each precoding matrix the communication device 10 computes the resulting signal to interference and noise ratios (SINRs) at the input of the demodulator (i.e., after equalization), and uses the SINRs to predict the performance if that precoding matrix is going to be used (e.g. predicts user throughput conditioned on the precoding matrix choice).

In step 34, the appropriate precoding matrix is selected, and in step 36 this is signalled to the transmitting communication device. A suitable precoding matrix is a matrix that gives a good performance metric, e.g. the precoding matrix with the highest predicted throughput. The selected precoding matrix may be applied across a wide band of frequencies, or different precoding matrices may be applied to different frequencies, i.e. to match the different channel conditions at different frequencies. In one embodiment, the codebook is known to both the receiving communication device 10 and the transmitting communication device. Each precoding matrix within the codebook has an index, and it is the index corresponding to the selected matrix that is signalled to the transmitting communication device. In LTE uplink transmissions, for example, this would be done on the PDCCH (physical downlink control channel). The UE would then decode the PDCCH and map the decoded bits to a precoding matrix.

Shortly thereafter, in step 38, the receiving communication device 10 receives a transmission from the transmitting communication device that is a symbol vector precoded using the selected precoding matrix. The received precoded vector is demodulated using the Tx/Rx circuitry 14. In step 40, the demodulated signal is decoded by the processing circuitry 16. The processing circuitry may use its knowledge of the selected precoding matrix to decode the demodulated signal.

The received signals are filtered, downconverted to the baseband and sampled in the Rx/Tx circuitry 14, and then fed to a baseband processing unit in the processor 16. The baseband processing unit knows the precoding matrix used in the transmission and with the help of an estimate of the channel first equalizes the channel and then decodes the precoded vector. In one embodiment, for example in LTE uplink transmissions, this could be done by transforming the signal to the frequency domain by means of a DFT (discrete Fourier transform), performing frequency domain equalization by combining the signals of each subcarrier appropriately (e.g. MMSE equalizer), and then applying an inverse DFT to get back to the time domain again. Knowledge of which precoding matrix was used may be needed in order to know how to combine the signals when performing equalization.

The above technique, known as closed-loop precoding, is particularly suited to scenarios where the channel conditions are relatively static. The mobility of the transmitting and receiving devices may be low, or the channel may exhibit long-term properties even though mobility is high. For example, where either the transmitting device or the receiving device is a radio base station, its mobility will be zero.

Alternatively, the precoding matrix may be selected independently of the MIMO channel. This is known as open-loop precoding or channel-independent precoding.

Figure 5:
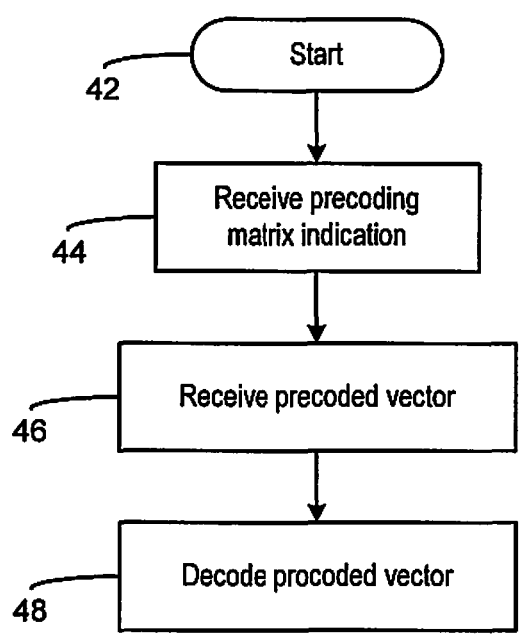
FIG. 5 shows a third method according to embodiments of the present invention.

FIG. 5 is a flowchart illustrating a method of receiving a MIMO transmission where open-loop precoding has been employed.

The method begins in step 42. In step 44, the receiving communication device 10 receives an indication of the precoding matrix that was used, or will be used, in the upcoming MIMO transmission. Thus, the transmitting device determines the appropriate precoding matrix to use on its own (by e.g. reverse link measurements) and then explicitly signals the precoding matrix to the receiver. The precoding matrix employed by the transmitting device is any matrix that satisfies the requirements to limit additional PAPR, as described above with respect to FIG. 3. As previously described, in one embodiment each precoding matrix within the codebook has an index, and it is the index corresponding to the selected matrix that is signalled to the receiving communication device 10.

In step 46, the receiving communication device 10 receives the precoded vector. This may occur after step 44, or substantially concurrently with step 44.

In step 48, the receiving communication device 10 decodes the precoded vector using knowledge of the precoding matrix, for example, as described with respect to step 38 of the previous embodiment.

Thus, in this embodiment, the processing circuitry of the transmitting communication device selects or generates a precoding matrix without input from the receiving device. Such open-loop precoding is particularly suited for scenarios where the channel conditions are liable to rapid change, or the mobility of the transmitting and/or receiving devices is high.

Figure 6:
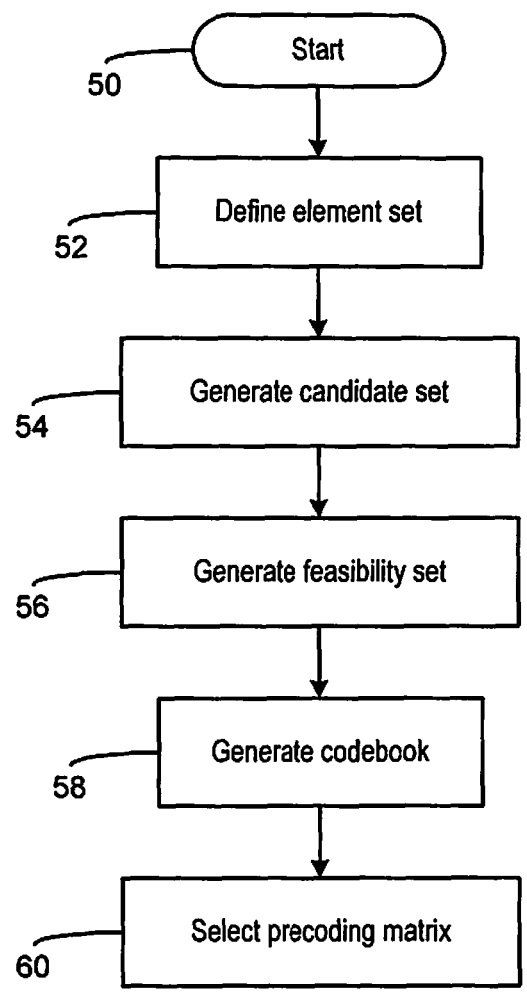
FIG. 6 shows a fourth method according to embodiments of the present invention.

FIG. 6 is a flowchart of a method of generating one or more precoding matrices according to embodiments of the present invention. The method may be performed, for example, in the processing circuitry 16 in order to generate a suitable precoding matrix, or offline in order to generate a codebook of precoding matrices.

The method begins in step 50.

In step 52, a set of elements A is generated. The elements are those that will eventually go into the precoding matrix, and therefore they may have a restriction placed on them that they all have the same norm. An example element set is $A=\{-1, 1, -j, j\}$, where $j^2=-1$. Such an element set has the benefit that computational complexity is saved when the resulting precoding matrices are used in the transmitter or the receiver.

In step 54, all possible rows of length r containing the elements defined in the element set are generated. In one embodiment, a constraint is placed on the rows such that each row may contain only one non-zero element. From the rows so generated a candidate set of possible precoding matrices is generated. The candidate set contains matrices of all the possible combinations of rows, where the number of rows in each matrix is equal to the number of transmitting antennas.

In step 56, the number of precoding matrices in the candidate set is reduced by applying one or more constraints as described above to generate a feasibility set of precoding matrices. The constraints applied may be any one or more of: each column having an equal number of non-zero elements; each column having at least one non-zero element; or that the precoding matrices are unitary.

In step 58, the feasibility set is itself reduced to generate a codebook of precoding matrices from which the final precoding matrix can be selected in step 60, as described above. The codebook may be chosen from the feasibility set by, for example, evaluating a distance measure between pairs of matrices in the feasibility set having the same transmission rank. In this embodiment, the codebook is therefore selected by maximizing the minimum distance between pairs of precoding matrices in the codebook. Various distance measures are known in the art, including chordal distance, projection two-norm, and Fubini-Study (see, for example, Love D J and Heath R W Jr, "Limited feedback unitary precoding for spatial multiplexing systems", 2005 *IEEE Trans. Inf. Theory* vol 51, pp 2967-76). The codebook may also be selected by maximizing the estimated throughput.

The present invention therefore provides a method and a communication device for transmitting over a MIMO radio link. An increase in the PAPR of the transmitted signals is limited by applying a precoding vector that is constrained in one or more ways. Reducing the increase in the PAPR reduces the complexity of the transmitting device, and so reduces the cost of the device and increases its reliability.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processing circuitry or other unit may fulfil the functions of several units recited in the claims. Any reference signs in the claims shall not be construed so as to limit their scope.

The invention claimed is:

1. A communication device adapted for single-carrier transmission over a MIMO radio link, the communication device comprising:
   a transmitter comprising a plurality of antennas; and
   processing circuitry,
   said processing circuitry being adapted for single-carrier transmission and to apply a precoding matrix to a symbol vector to generate a precoded vector,
   said precoding matrix having four rows and two or three columns,
   said transmitter being adapted to transmit said precoded vector over a MIMO radio link using only a single carrier, wherein
   said precoding matrix is constrained such that each row comprises at least one zero element, such that the number of non-zero elements in each row is less than the number of columns in said precoding matrix, and
   said precoding matrix is further constrained in that each of said columns has at least one non-zero element and each of said rows has at least one non-zero element.

2. The communication device as claimed in claim 1, wherein said precoding matrix is constrained such that each row has a single non-zero element.

3. The communication device as claimed in claim 2, wherein the precoding matrix has two columns, and wherein said precoding matrix is constrained such that each column has the same number of non-zero elements.

4. The communication device as claimed in claim 1, wherein said precoding matrix is constrained such that each column has the same number of non-zero elements.

5. The communication device as claimed in claim 1, wherein each non-zero element has the same absolute value.

6. The communication device as claimed in claim 1, wherein said precoding matrix is selected from a codebook comprising a plurality of predetermined precoding matrices.

7. The communication device as claimed in claim 6, wherein a subset of said plurality of predetermined precoding matrices are constrained.

8. The communication device as claimed in claim 1, wherein said processing circuitry is adapted for discrete Fourier transform spread orthogonal frequency division multiplexed (DFTS-OFDM) transmissions.

9. The communication device as claimed in claim 1, wherein said communication device is a user equipment.

10. The communication device as claimed in claim 1, wherein said communication device is a radio base station.

11. A method in a communication device of single-carrier transmission over a MIMO radio link for limiting increase in peak to average power ratio (PAPR), comprising:
    applying a precoding matrix to a symbol vector, generating a precoded vector; and
    transmitting the precoded vector over the MIMO radio link using only a single carrier, wherein
    said precoding matrix has four rows and two or three columns,
    said precoding matrix is constrained such that each row comprises at least one zero element, such that the number of non-zero elements in each row is less than the number of columns in said precoding matrix, and
    said precoding matrix is further constrained in that each of said columns has at least one non-zero element and each of said rows has at least one non-zero element.

12. The method as claimed in claim 11, wherein said precoding matrix is further constrained such that each row has a single non-zero element.

13. The method as claimed in claim 12, wherein the precoding matrix has two columns, and wherein said precoding matrix is constrained such that each column has the same number of non-zero elements.

14. The method as claimed in claim 11, wherein said precoding matrix is constrained such that each column has the same number of non-zero elements.

15. The method as claimed in claim 11, wherein each non-zero element has the same absolute value.

16. The method as claimed in claim 11, wherein said precoding matrix is selected from a codebook comprising a plurality of predetermined precoding matrices.

17. The method as claimed in claim 16, wherein a subset of said plurality of predetermined precoding matrices are constrained.

* * * * *